Patented Feb. 18, 1947

2,416,064

UNITED STATES PATENT OFFICE 2,416,064

CHROMITE ORE PIGMENT

Gordon Derby Patterson, Wilmington, Del., and Clifford Kanne Sloan, Thornton, Pa., assignors to E. I. du Pont de Nemours & Company, Wilmington, Del., a corporation of Delaware No Drawing. Application April 28, 1943, Serial No. 484,878

9 Claims. (Cl. 106—302)

This invention relates to pigment-useful substances, and has more particular reference to novel metal protective pigments adapted for use in various coating compositions.

Metal protective pigments have long been used in the priming coat of organic film-forming compositions applied to the surfaces of metallic objects. They have been effective, at least in part, because of a specific inhibiting or passivating action exerted at the surface of the metal. Among the pigments useful in this field are red lead and certain chromium-containing materials. However, these products have not met all practical requirements, judging from the wide use that is made of iron oxide, a relatively non-inhibitive but cheap type of pigment. Among deterrents to the use of red lead are its paint instability, chalking, and high cost as used. The use of prior chromium-containing pigments also has been characterized by high costs due largely to the many expensive and time-consuming steps necessary in their manufacture. For instance, these chromium-containing metal protective pigments are usually prepared by filtering, drying and further processing a precipitate obtained from a water-soluble alkali chromate or bichromate obtained in turn after a number of purification steps, following the leaching of a mass obtained by roasting soda ash, chromite ore and lime. Furthermore, practical use of the prior art chromium-containing pigments has demonstrated that their protective action in paint films on exposure is not satisfactorily effective. It is apparent that the inhibitive action of the chromate constituents of these pigments is not sufficiently available for as long a time as is to be expected of a protective coating.

Prior art materials have been obtained with a view to securing a usable chromate material by heating chromite ore. Thus, ordinary commercial processes for production of chromate depend on roasting chromite ore with both lime and a more active alkali, such as soda ash. If the latter is omitted, the yield of hexavalent chromium is considerably reduced and the chromium compound that is formed is not sufficiently soluble to make the process a practical one for commercial chromate production. Accordingly, attempts to prepare chromates by heating chromite ore and lime have been handicapped by the necessity of added processing, such as autoclaving with soda ash or treatment with an active acid. Furthermore, in attempting to secure maximum chromate conversion, excessive amounts of lime are used with the chromite ore, making the resultant material impractical for metal protective pigment purposes.

We have discovered that certain high temperature reaction products of alkaline earth oxides and chromite ore prepared in accordance with our invention are directly useful as metal protective pigments, and, in fact, have unexpectedly high value in imparting anti-corrosion properties to films of organic coating compositions applied to metal surfaces. This high protective performance is surprising in view of the relatively low hexavalent chromium content of our product, as compared with commercial chromate-containing pigments such as chrome yellow, zinc yellow and the like.

Accordingly, a principal object of this invention is to overcome the disadvantages of such prior chromium-containing pigments and to provide novel pigment substances generally useful in coating formulations and particularly effective for use as metal protective pigments in organic film-forming vehicles adapted to be applied to metallic surfaces, especially those subject to corrosion. A further object is to prepare a chromium-containing pigment, the hexavalent chromium component of which has a maximum opportunity for exerting an inhibitive action during exposure on a metal surface. A still further object is to prepare our pigments by a simplified process whereby one can obtain a highly useful and effective product at relatively low cost. Other objects and advantages will be apparent from the ensuing description.

These objects are attainable in this invention by our novel pigment compositions, adapted for control of corrosion, and which contain, as the essential active pigment ingredient, a reaction product obtained by subjecting an intimate mixture of a chromite ore and an alkaline earth material which is heat-decomposable to the oxide, to treatment at a relatively high temperature in the presence of an oxidizing medium, followed by disintegration of the dry reaction product which results to a state of fineness suitable for pigment use.

More specifically, the invention comprises an improved metal protective type of pigment prepared by subjecting a finely-divided, intimate mixture of chromite ore and an alkaline earth material, such as lime, to roasting treatment at a relatively high temperature in the presence of oxygen or an oxygen-containing gas, followed by disintegration of the resulting dry reaction mass to desired pigment particle size fineness, such care and control being exercised over the ratios, types of reactants and treating methods used that the pigment inherently exhibits certain required values in respect to hexavalent chromium content, pH, acid-insoluble residue, color, particle size, etc.

In practically adapting the invention, a commercial grade of chromium-mineral ore, such as Transvaal chromite ore, preferably is dry disintegrated by treatment, first in a jaw crusher, and then in a ball or other grinding or pulverizing mill, to reduce the ore to a state of relatively fine particle size. This finely-divided or powdered material is then intimately mixed with controlled amounts of an alkaline earth compound, such as calcium oxide or hydroxide, also in relatively finely comminuted state. Intimate association of the pulverized ore and alkaline earth material is readily effected by resort to conventional mixing apparatus, such as by means of a short ball milling treatment, and while the reactants are in wet or dry condition. Resort to this mixing and grinding treatment serves the desired purpose of controlling both the subsequent reaction of the mixture and the size of the pigment particles ultimately recoverable therefrom. After desired homogeneous association of the reactants, the mixture is roasted, under controlled conditions, and in the presence of an oxidizing agent, in a rotary or other conventional type of furnace. Preferably, roasting temperatures ranging from about 1050° C. to about 1150° C. are utilized with the oxidizing agent comprising gaseous oxygen or air. The extent of the roasting is largely governed by the time required for supplying the oxygen component of the reaction, the temperatures used, the extent of hexavalent chromium conversion desired, and by the pH and other essential properties which the final pigment is to exhibit. Usually, roasting periods of from about thirty minutes to an hour suffice for the reaction on a small scale and in an electrically heated furnace. In large scale operations and where an internally-fired furnace is used, from about 2 to about 6 hours at the indicated temperatures may be required, due principally to the difficulty of maintaining a sufficiently high concentration of oxygen in the combustion gases at the higher temperature used. After the desired roasting treatment, the alkaline earth-chromium ore reaction product is allowed to cool, and is then directly converted into a pigment by disintegration through treatment in conventional disintegrating apparatus. A hammer mill of the "Mikropulverizer" type can be effectively used for this purpose, one or two passes through the mill with a screen opening of 0.020–0.029 being usually sufficient. To promote the efficiency of the mill, we prefer to employ the same in circuit with an air classification system for removal of undesirably large particles. The product which is recovered, due to its low cost, its color and hiding power characteristics, will be generally useful as a pigment and as the sole pigment substance of a film-forming composition. It is particularly useful as the primer pigment in films of organic coating compositions for the protection of metallic surfaces, especially those subject to corrosion. Thus, it is usefully effective in the protection of iron and steel surfaces and of non-ferrous metals, including aluminum, zinc, magnesium and the like, as well as alloys, particularly light-weight alloys, such as those of aluminum and magnesium, especially the types used for aircraft construction. The reaction product can also be used in any way in which a pigment, and more particularly an inhibiting pigment, can be employed. Thus, it can be used as a component of greases, non-drying oils, fatty acids and similar compositions for the protection of metallic surfaces against corrosion. Due to its low cost, it can, if desired, be employed without a vehicle and as a dry packing material for corrodible objects for transit.

To a clearer understanding of the invention, the following specific examples are given, each being in illustration but not in limitation of the invention:

*Example I*

Twenty-eight hundred and eighty pounds of water are run into a wood vat equipped with a paddle agitator. Six hundred and forty-eight pounds of lump lime are slowly added with constant agitation so as to avoid overheating during the slaking process. The slaked lime is then fed as a water slurry by gravity to a 1200 gallon pebble mill, the charge being augmented by 792 pounds of pulverized Transvaal chromite ore having a $Cr_2O_3$ content of 42%, the ore being previously pulverized to pass 100% through a 100-mesh sieve and 85% through a 325-mesh sieve. The charge in the ball mill is then subjected to a 3-hour grinding period at which time 97.2% of the suspended matter passes through a 325-mesh sieve. The ground slurry is then pumped to filter frames where the water content is reduced by half to give a press cake having 50% solids. The filter cake is approximately 1⅛ inch in thickness. The press cake is dried overnight in an oven heated by 20 pounds steam pressure. Sixteen hundred and seventeen pounds of material is handled at this stage, the change in weight being largely due to the water taken up during slaking of the lime. The press cake lumps are then charged into a batch rotary furnace preheated by internal firing with fuel oil. The furnace is 10 feet in length, 8 feet in internal diameter, and rotates once each minute. The furnace is equipped with thermocouples at both ends, permitting accurate control of temperature during the roast. After a 2-hour period required for bringing to temperature, the furnace is held at temperature for 3 hours, the temperature reading being 1150° C. at the front or combustion end of the furnace and 1100° C. at the exit end of the furnace. Fuel oil is supplied to the burner at 40 lbs./sq. in. pressure with a consumption of 17 gallons per hour. In addition to the primary air used in the combustion of the oil, an auxiliary air line is used to supply extra air at the rate of 140 cubic feet per minute in order to accelerate oxidation. The roasted product is then discharged through a pair of manholes in the furnace into a "buggy" equipped with water-cooled coils. The product at this point is in the form of small, friable, marble-like lumps averaging ½ inch in diameter. For conversion to final pigment form, the dry reaction product is disintegrated by passing through a "Mikropulverizer" equipped with a screen having openings of 0.020 inch. The recovery is 1394 pounds, the overall losses in processing being approximately balanced by the oxygen taken up during oxidation of the chromite. The resulting product is useful as a metal protective pigment.

The resultant pigment has a hexavalent chromium content of 14.4% (calculated as $CrO_3$), an acid-insoluble residue of 9.5%, a pH value of 11.50 (unboiled slurry) and of 11.65 (boiled slurry), and a residue of 5% on a 325-mesh screen when sprayed thereon with mineral thinner.

Example II

A pigment of general usefulness as a component of metal protective coating composition films under ordinary atmospheric conditions is prepared in the following manner:

One hundred twenty-five parts of chromite ore having a $Cr_2O_3$ content of 41.5% and dry ground to pass a 100-mesh screen is added to a pebble mill along with 125 parts of lime and 500 parts of water and the mass ground for 16 hours. The chromite/lime slurry is then filtered and the resulting press cake dried overnight in an oven at 100° C. The dry intimate mixture is then roasted in an electric furnace at 1000° C. with air passing through the furnace. After roasting 3.5 hours, the reaction product is removed from the furnace and cooled. The dry reaction product is 97.5% soluble in 1:1 nitric acid. It contains 19.2% hexavalent chromium calculated as $CrO_3$ and has a pH of 11.2.

Example III

Seven pounds of chromite ore pulverized to pass a 100-mesh screen are charged into a steel ball mill along with 7 pounds of similarly pulverized lime. The ball mill has as internal dimensions a diameter of 15 inches and a length of 21 inches and holds 140 pounds of $\frac{9}{32}''$ steel balls. The dry mixture is ground in the ball mill for 23 hours, after which the charge is briquetted using a pressure of 1000 lbs./sq. in. The pressed mixture of lime and chromite ore is then roasted in 4-pound batches in a rotating nickel tube externally heated in an electric furnace with air supplied to the contents at a rate of 1 cu. ft./min. Each batch is brought to a roasting temperature of 960° C. and held at temperature 3 hours and discharged in lump form. The batches are combined and "mikro-pulverized" using a screen having 0.029 inch openings. The finished pigment product has a hexavalent chromium content of 18.9% calculated as $CrO_3$, is 97.5% soluble in nitric acid, and has a pH of 11.2 when slurried in water. It has a density of 3.42.

The resultant pigment prepared entirely by dry reactions is useful as a metal protective pigment. Thus, after incorporation at 40% by volume in a linseed oil film-forming coating composition and after application to a vigorously wire-brushed prerusted iron surface, the system is in excellent condition after a year's outdoor exposure to the elements, whereas a similar surface coated with an iron oxide control paint is corroded after identical exposure. A corresponding system with red lead as the sole pigment shows moderately severe corrosion under identical exposure conditions.

Example IV

A roughly pulverized mixture of 151 parts of chromite ore and 243 parts of limestone (equivalent to 136 parts free lime) is ball milled overnight with 200 parts of water. The ground slurry is filtered and dried. The dry lumps are then roasted at 1000° C. for an hour with ready access to air. The roasted mass is "mikro-pulverized" through a 0.029 inch screen to convert to pigment form. The product has a hexavalent chromium content of 17.8% calculated as $CrO_3$, is 97% soluble in nitric acid, and has a pH of 11.4 when tested as a water slurry. The inexpensive product serves as a highly efficient pigment when incorporated in organic film-forming compositions used in priming metal surfaces.

Example V

Two hundred seventy-four parts of barium oxide and 137 parts of chromite ore (42% $Cr_2O_3$ content) are ground two hours in a pebble mill with water. The ground slurry is filtered and dried and roasted 2 hours at 1100° C. with ready access of air. The resultant product is pulverized to pigment form in which it is useful in organic film-forming coating compositions. The pigment has a hexavalent chromium content of 16.2% (calculated as $CrO_3$), has a pH of 11.9 when tested in water, and is 82% soluble in nitric acid.

The general usefulness of the pigment of this invention as a metal protective pigment is clearly demonstrated from its excellent behavior on outdoor exposures, particularly exposures in warm, humid climates. Thus, the average grading of a number of exposures of steel surfaces protected by an alkyd-fortified linseed oil vehicle composition pigmented 40% by volume with, for instance, the dry reaction product of Example I, is considerably superior to that of a corresponding iron oxide-pigmented system after a year and a half outdoor exposure. This is illustrated by the following table of results from such an exposure:

| System | Grading of relative freedom from rusting |
| --- | --- |
| Chrome ore-lime reaction product | 8.4 |
| Iron oxide | 4.0 |

The significance of the code used in reporting extent of corrosion is as follows, a difference of 1.0 point in the grading being material:

| Grading | Condition |
| --- | --- |
| 10.0 | No rusting. |
| 7.0 | Slight rusting. |
| 5.0 | Considerable rusting. |
| 2.0 | Severe rusting. |

Intermediate conditions are graded proportionately.

An alkyd-fortified linseed oil paint prepared in a similar manner except that a part of the chrome ore-lime reaction product pigment is replaced by iron oxide and talc to give a 75/10/15 ratio by weight of reaction product/iron oxide/talc is superior in performance to paints prepared by a corresponding extension of prior art metal protective pigments. Thus, the average grading of a number of panels coated with this system is superior after exposure to that of panels coated with similar systems in which the chrome ore reaction type product of Example I is replaced by an equal volume of iron oxide or zinc yellow as the prime pigment. The average gradings are as follows:

| Prime pigment | Grading of relative freedom from corrosion |
| --- | --- |
| Chrome ore/lime reaction product | 7.3 |
| Zinc yellow | 4.3 |
| Iron oxide | 1.5 |

The corresponding series of linseed oil primer paints in which the primer pigment is substituted on the above 75/10/15 basis, shows the advantage of the chrome ore reaction product pigment over prior art pigments. After application of the linseed oil coating compositions to previously rusted and wire brushed iron surfaces and exposure of the painted surfaces for one year in a subtropical climate, the pigment of Example I shows marked advantages in protection of the underlying metal against corrosion. The relative gradings of the three systems, as to degree of corrosion, are as follows:

| Prime pigment | Grading of relative freedom from corrosion |
|---|---|
| A. Chrome ore/lime reaction product | 7.5 |
| B. Zinc yellow | 4.8 |
| C. Iron oxide | 2.0 |

As stated, in practicing the invention such care is exercised as will insure a final product suitable for an intended or pigment use. Particularly, care is taken that the product will exhibit certain essential values in respect to hexavalent chromium content, pH, acid-insoluble residue, color and particle size.

For example, the alkaline earth/chromite ore dry reaction product or pigment of this invention should contain at least 1.5% and up to, say, 30%, of hexavalent chromium, calculated as $CrO_3$ (determined by dissolving the pigment in nitric acid and titrating with a standard ferrous ammonium sulfate solution). Preferably, and for marked metal protective effectiveness in coating compositions, said hexavalent chromium content ranges from about 8% to about 21%, with optimum results accruing when the content is about 12% and between 10% and 18%. These preferred pigments are generally obtainable by (1) using a relatively low alkaline earth/chromite ore ratio (e. g., a lime/ore ratio of, say, 45/55 instead of 50/50), (2) a longer raw grinding period, and (3) higher roasting temperatures (1050° C.–1150° C.). Such pigments are more resistant to cracking on exposure of the paint film to unusually high moisture conditions and characteristically have a definitely lower pH value than that of the free alkaline earth oxide, corresponding to the alkaline earth material from which the products are prepared. Higher hexavalent chromium contents (beyond the indicated preferred range) can be obtained by controlling a number of variables, including: (1) using a higher alkaline earth material/chromite ore ratio, (2) shortening the period of grinding of the unroasted material, and (3) roasting at a relatively moderate temperature (950° C.–1050° C.). By such methods and by use of selected chromite ore grades and of higher oxygen content during roasting, $CrO_3$ values up to the limit of the indicated preferred range can be obtained. Products with higher $CrO_3$ content are not preferred, however, because they exhibit somewhat lessened durability characteristics on exposure to high moisture conditions, in comparison with pigments prepared of somewhat lower hexavalent chromium content and pH value.

As indicated, it is desirable that the pH of the reaction product be definitely lower than that of the free alkaline earth used in its manufacture. Preferably, and in order to insure film durability, the pH value is at least from 0.3 to 0.5 units below that given by the free alkaline earth oxide, if present as such in the finished product. Generally the pH may range from about 8.9 to below about 12.3 (say, to about 12.0); a preferred range being from 10.8 to 11.8, with 11.4 being optimum. A product containing appreciable amounts of undesirably basic calcium compounds which, when tested in a water slurry with a Beckman glass electrode potentiometer, exhibits a pH in excess of about 11.80, is unsuitable for use where exposure of the paint to water is involved, as in outdoor exposures. This test can be set up as a standard control test for use during progress of the roasting operation. The pH reading is taken after 30–60 minutes intermittent agitation, at room temperature, of a slurry containing 1 gram of the reaction product pigment in 100 cc. of water. Further assurance that the pH is not too high can be had by making a second test on such a slurry by boiling for one hour, and determining the pH of the slurry after again cooling to room temperature. Under these conditions of test, free lime gives a pH reading of about 12.3.

The production of a pigment low in pH value can be brought about (1) by using smaller amounts of the alkaline material in the roast mixture, (2) by grinding the raw pigment components a longer time, and (3) by roasting longer and at a higher temperature. If, however, raw pigment grinding is excessive, the resultant pigment will be undesirably low in hexavalent chromium content and unnecessarily high in acid-insoluble residue. For a lower alkaline earth/ore ratio (such as 45/55 lime/ore), this overgrinding difficulty is more apt to be encountered than with a higher ratio (such as 50/50). With the 50/50 composition, the longer grinding period is preferred because of its effect in lowering the pH of the final product.

The acid solubility of the reaction product material is also useful in selecting conditions for preparing satisfactory pigments. Acid-insoluble residue is expressed in terms of the percentage of the pigment remaining insoluble after digesting a few minutes in warm 1:1 nitric acid. The commercial chromite ore is made more acid-soluble as the course of the roasting proceeds. With a 50:50 lime/ore ratio the final product is almost completely soluble, i. e., its acid-insoluble residue value will be of the order of 0–2%. Although a residue of 0% may be due to an exact balance between the lime and chromite ore ingredients, we prefer, in obtaining a product useful for general pigment purposes, to so adjust the conditions of manufacture that the final product will give an acid-insoluble residue value of at least 1%, and not to exceed about 90%. A most usefully operative range comprises from about 2% to about 15%, while an optimum range comprises from about 5% to 10%. Maintaining a residue value at the lower limit of at least 1% can be conveniently had either by slight reduction in the amount of lime added, or by increasing the period of grinding of the unroasted mixture. Using a lower lime/ore ratio such as 45/55 affords a higher acid-insoluble residue value in the final product, e. g., of the order of 8% to 15%. Products having a 90% residue result from use of a high chromite ore concentration. These, however, exhibit decreased general utility as metal protective pigments. Since general metal protective utility decreases as the acid-insoluble residue increases, we prefer to utilize in the final product the indicated 2% to 15% acid-insoluble residue values.

The water solubility of our preferred pigments will be found to be relatively low. For example, if a test sample is slurried with water at 20° C. for 5 minutes with vigorous agitation, less than 0.2% of the material is dissolved.

Although diminution of the acid-insoluble content is useful in determining the course of the roasting of a given raw pigment, it is not to be inferred that an excessively low residue is necessary. Thus, a residue of 10% with a 45/55 raw mixture is often indicative of a better pigment than is a residue of 2% with a 50/50 mixture. Higher temperatures usually give lower acid-insoluble residues, although hexavalent chromium content is decreased thereby. For a given set of raw pigment conditions, however, it is advisable that roasting be continued until the acid-insoluble fraction reaches a minimum desired level.

The color of the final product is also important and is of considerable use in following the course of the reaction as well as determining the usefulness of the product as a pigment. The lime/chromite ore reaction product pigments may vary in color from reddish-brown to black to green, but usually vary from dark reddish brown to black. A light green color usually is indicative of too high an initial alkaline earth/ore ratio, too short a roast, or too low a roasting temperature. A pronounced reddish-brown color is usually indicative of an excess of unreacted chromite ore. A reddish brown color can also result if insufficient oxidizing conditions prevail during roasting. Preferably, we so adjust the amount of lime that we obtain our preferred, relatively black colored pigments, indicating that neither ore nor lime is in excess. These preferred pigments show a characteristic selective absorption of light over the wave length range 4000-7000 Å. as is shown by examination with a recording spectrophotometer. Thus, said preferred products usually conform to the following limits:

(1) The ratio $\frac{\% \text{ reflectance at 7000 Å}}{\% \text{ reflectance at 4000 Å}}$ is not more than 2.20

(2) The ratio $\frac{\% \text{ reflectance at 4800 Å}}{\% \text{ reflectance at 4000 Å}}$ is not more than 1.70

(3) The ratio $\frac{\% \text{ reflectance at 4800 Å}}{\% \text{ reflectance at 6000 Å}}$ is between 0.80 and 1.20

Particle size of the final product is also of considerable importance in determining its usefulness for general pigment purposes and especially as a pigmenting ingredient in metal protective paints. In general, the final product should be substantially free of particles larger than 20 microns, at least 90% of its particles should pass 325 mesh, and the grit value of the raw pigment (% retained by 325 mesh screen) should be less than 15%. Preferably, the major portion of the pigment is below 5 microns, with a substantial fraction thereof being as low as 0.5 to 2 microns, e. g., at least 95% of the particles should pass 325 mesh, and its grit value should be less than 5%. An optimum type of pigment affords a 99% passage through 325 mesh and has a grit value of less than 2%. By resort to the grinding steps before and after roasting, a pigment having these satisfactory particle size and other values will be obtained. As already stated, one pass of the roasted material through a "Mikro-pulverizer" is usually sufficient to reduce the material to a state of subdivision suitable for pigment use. The residue retained in the 325-mesh screen test is somewhat governed by the screen used in the "Mikropulverizer" disintegration. With a 0.020 inch screen, the 325-mesh residue may be of the order of 1 to 5%, whereas with a 0.029 inch screen it is about 2 to 10%. With an air classification unit in series with the grinding unit, even greater diminution of particle size can be obtained, e. g., less than ½% of the product being retained by a 325-mesh screen. These figures are somewhat dependent on the many factors of processing.

As already stated, most commercial grades of chromite ($Cr_2O_3 \cdot FeO$) ore are suitable for use in the invention. Unlike metallurgical requirements, it is not necessary that the ratio between chromium and iron be above a certain high figure, such as 3:1. Effective pigments can be prepared by the use of certain Transvaal chromite ores, the iron oxide content of which is as high as 24%. Although ores having a $Cr_2O_3$ content in the 40-50% range are particularly suited for use, higher or lower grade ores can be employed. Illustrative of different types of utilizable chromite ores, with their characteristic analyses as given in the Industrial Mineral and Rocks, American Institute of Mining and Metallurgical Engineers 1937, page 205, are the following:

| Source of chromite ore | Analyses, per cent | | | | | |
|---|---|---|---|---|---|---|
| | $Cr_2O_3$ | FeO | $Al_2O_3$ | $SiO_2$ | CaO | MgO |
| Brazil | 42.6 | 13.8 | 14.6 | 7.4 | 2.1 | 15.9 |
| Canada | 43.1 | 16.8 | 10.2 | 8.3 | 1.0 | 17.9 |
| Cuba | 31.3 | 14.3 | 26.9 | 5.6 | 0.8 | 17.2 |
| | 31.5 | 13.9 | 26.6 | 6.3 | 1.2 | 17.7 |
| | 30.5 | 14.2 | 27.5 | 6.1 | 0.9 | 18.3 |
| Greece | 37.4 | 15.6 | 21.4 | 4.8 | 0.8 | 16.8 |
| | 36.1 | 15.4 | 22.4 | 5.2 | 0.7 | 16.0 |
| | 38.3 | 15.7 | 21.6 | 4.7 | 0.6 | 16.5 |
| Lalapanzi (Africa) | 46.6 | 19.6 | 13.6 | 4.7 | 0.4 | 11.7 |
| Philippines | 32.1 | 13.0 | 27.6 | 5.3 | 1.1 | 18.2 |
| | 54.4 | 14.1 | 11.6 | 2.5 | 0.6 | 16.1 |
| Rhodesia (Africa) | 45.4 | 15.1 | 13.8 | 7.5 | 0.5 | 13.6 |
| | 44.9 | 15.3 | 12.9 | 7.7 | 0.5 | 14.3 |
| | 46.5 | 12.8 | 15.4 | 7.0 | 0.9 | 13.7 |
| Russia | 39.1 | 14.7 | 15.6 | 7.7 | 1.2 | 16.4 |
| | 40.0 | 14.1 | 15.3 | 10.1 | 0.4 | 16.5 |
| | 46.2 | 15.6 | 14.6 | 4.0 | 0.3 | 15.4 |
| Serbia | 47.7 | 12.2 | 12.5 | 6.2 | 0.9 | 15.9 |
| Transvaal (Africa) | 44.1 | 24.0 | 14.5 | 3.6 | 0.8 | 11.6 |
| | 44.9 | 25.0 | 14.7 | 2.2 | 0.8 | 10.5 |
| | 45.0 | 25.7 | 15.1 | 1.8 | 0.7 | 9.8 |
| Turkey | 47.0 | 12.5 | 13.5 | 7.3 | 1.3 | 19.2 |
| | 40.5 | 12.5 | 11.0 | 11.9 | 0.9 | 20.0 |
| | 46.6 | 12.9 | 12.5 | 6.7 | 1.2 | 17.3 |

Certain sources of domestic ores also can be used, particularly after concentration of the chromium component.

Comminution of the components of the chromite ore and alkaline earth materials prior to roasting is an essential part of this invention. It is necessary that the particle size of the raw pigment ingredients be reduced at this point to insure satisfactory ultimate pigment particle size, as well as sufficient chemical reaction during the roasting process. The intimate mixture of the chromite ore and alkaline earth material can be accomplished either during or subsequent to the final grinding of the component parts. As stated, such intimate mixing and grinding steps have the dual purpose of controlling both reaction and suitable size of pigment particles. The intimate mixture can be accomplished during a short ball milling operation with the lime slurry and pulverized chromite ore. When the components are wet ground, it can be accomplished simply by thorough wet blending. The wet blend can be filtered and dried prior to roasting or the wet cake can be fed directly to the roaster. If the wet press cake is dried prior to roasting, it is preferable that any breaking up of the dry lumps should be merely superficial, as the use of a fluffy pulverized powder during the roasting operation somewhat limits the desired reactions.

If the intimate mixture of the ingredients is obtained by dry grinding, it is often advisable that the resultant material be compacted prior to roasting, said compacting being accomplished either in the last stages of the dry grinding step itself or in an added pressure compacting or briquetting operation. In large scale operations, sufficient compacting may occur in the roasting process during rolling of the charge in the furnace.

Most, if not all, of the comminution of ore necessary for obtaining both reaction during roasting and the suitably fine particle size for pigment use can be conveniently carried out prior to mixing with the alkaline earth material. The chromite ore is most economically separately processed from the lump form to a finely-divided powder, most of which passes through a 325-mesh screen. In effecting this, a series of dry grinds through jaw crusher, disc attrition, and steel ball mills usually suffice to reduce the ore to a stage where all of the material passes through a 100-mesh screen and about 85% passes through a 325-mesh screen. "Micronizing" is a further practical means of subdivision. The final comminution is preferably, but not necessarily done in the mix with the alkaline earth material. To obtain optimum effects, this final comminution, whether done in the presence or absence of alkaline earth material, is continued until all but about 1-5% of the material passes a 325-mesh screen.

As the alkaline earth component of the reaction with the chromite ore may be used any compound or mixture thereof which is in oxide form or is thermally decomposable to the alkaline earth oxide at or below the temperature being used in the roasting operation. Specifically useful oxides include those of calcium, strontium and barium. Examples of other useful compounds are the various alkaline earth hydroxides and salts, including carbonates, acetates, and the like, which decompose in the presence of chromite ore at or below the roasting temperatures used. Calcium compounds, such as calcium oxide, calcium hydroxide, and calcium carbonate, are preferred because more adaptable for commercial application. Thus, lump lime, air-slaked lime, water-slaked lime, and limestone serve as excellent starting materials. In the case of limestone, the rock is desirably ground to a powder before the final comminution which is carried out in the same manner as that for the chromite ore above referred to. In the case of lump lime, much of the necessary initial comminution is automatically accomplished in a water-slaking operation which can be employed prior to final comminution by grinding.

The ratio between the amounts of alkaline earth and chromite used depends upon a number of factors, including: (1) raw materials used, (2) amount of grinding, and (3) roasting time and temperature. The amount of alkaline earth material to be used is dependent on its basic equivalent. Although the ratios are conveniently expressed in terms of the ratio lime/chromite ore, the ratios for other alkaline earth materials can readily be calculated therefrom. Generally, the ratio of lime may range from about 15% to about 70%, and is preferably from about 40% to 50%. For preparation of pigments that are durable to moisture conditions encountered in outdoor exposures, lime/chromite ore ratios as high as 55/45 can be employed by exercising care during processing. With the higher lime contents, such is ratios of 70/30, for example, a greenish rather than a durable type of pigment results. On the other hand, when ratios as low as, say, 15/85 are used, the products are less useful from a metal protective viewpoint, due to a lower hexavalent chromium content and higher content of unattacked chromite ore. As noted, the ratio range of from 40/60 to 50/50 is most generally useful. It is desirable, however, that with the higher lime ratios the processing variables be so adjusted that avoidance of free lime in the finished product will be had. For example, when using as high a ratio as 50/50, it is usually necessary to grind the raw materials to a greater extent, as illustrated in Example II, and/or conduct the roast at a higher temperature if a highly durable pigment is wanted. The range in ratio between 42/58 and 48/52 is preferred (a lime content of about 45% being optimum), especially when working with the ordinary grade of chromite ore averaging 42% to 48% in $Cr_2O_3$ content.

Although one of the reactions involved in the roasting step is that of oxidation of chromium from the trivalent to the hexavalent condition, this is apparently but one of a number that occur. The best pigment need not necessarily exhibit the highest hexavalent chromium content. Most effective pigments can be prepared at temperatures above that at which maximum hexavalent chromium conversion is obtained. Thus, while temperatures in the range of 1050° C.-1150° C. are preferred, and about 1150° C. is optimum, higher hexavalent chromium content can often be obtained at lower temperatures. In certain instances, such as when low lime ratios are used, temperatures as low as 900-950° C. can be employed. Even at temperatures as low as 700° C., a reaction occurs, i. e., conversion to hexavalent chromium takes place, but since the reaction is very slow they are obviously of less practical utility. Higher temperatures, of the order of about 1200° C., are generally more useful in preparation of durable pigment products, even though some attendent sacrifice in pigment texture may be experienced when such higher temperatures are resorted to. Accordingly, we contemplate the use of temperatures ranging from about 700° C. to about 1200° C., and especially within a range of from 900° C. to 1200° C. Preferably, temperatures ranging from about 1000° C. to about 1200° C. are used, with optimum results accruing herein with the employment of temperatures of 1100° C. to 1200° C.

The time of the roast is largely governed by that required for supplying the oxygen component of the reaction. Whereas from one-half to one hour usually suffices for the reaction in small scale operations in an electrically heated furnace, as much as 2 to 6 hours at the indicated preferred temperature is often required when operating the process in an internally-fired furnace on a relatively large, commercial scale because of the difficulty of maintaining a sufficiently high concentration of oxygen in the combustion gases at the higher temperature used. In any case, the course of the reaction can be followed by testing progress samples for hexavalent chromium, acid-insoluble residue, and pH, and continuing the roasting until these values level off. Inasmuch as hexavalent chromium conversion is usually more complete at temperatures below that desirably used in the roast, it is often advisable to supply oxygen to the charge on the down-heat, i. e., the charge is preferably not dumped until a temperature of 900° C. has been reached, the supply of air being continued after the fuel rate is decreased.

When cooled, the alkaline earth/chrome ore reaction product is directly converted into pigment form by disintegration. This can be carried out by any well-known, conventional disintegration or grinding equipment, such as ball, pebble, rotary hammer, Raymond or ring roll mills, &c. Use of a hammer mill of the "Mikropulverizer" type is very advantageous for this purpose and one or two passes through such a mill with a screen opening of 0.020-0.029 inch usually suffices, especially if the grinding unit is in series with an air classification device. For certain uses, it is advisable to resort to more vigorous disintegration methods, including "micronization." This direct conversion of the roasted reaction product to pigment form solely by a dry process is very desirable. Processing the roasted material by a wet method, such as by wet pebble milling, while utilizable, is not preferred because it impairs the effectiveness of the resulting pigment to some extent and gives a product of somewhat more limited application. Thus, an aftertreatment of the pigment with water prior to exposure in the film gives a product that is somewhat prone to impart a cracking tendency to a coating composition film pigmented therewith on exposure to the atmospheric elements. It is known that the pigments of the invention undergo an increase in weight when exposed to water and it appears desirable that this increase in weight take place after film formation rather than before.

While we have alluded above to a few of the organic film-forming compositions in which the pigment of our invention is useful, it is to be understood that the pigment has general usefulness in organic film-forming vehicles and particularly in such systems when used in the protection of metal surfaces. Thus, the dry reaction product pigment is useful with various oleoresinous vehicles including linseed oil, China wood oil, oiticica oil, and the like, nitrocellulose and other cellulose derivatives used in coating compositions, chlorinated rubber, alkyd and alkyd-fortified oleoresinous systems, phenol-formaldehyde resins such as Bakelite and the like, Vinylite, vinyl acetate and polyhydric alcohol-mixed esters of drying oil acids and other monofunctional monocarboxylic acids such as beta-furylacrylic acid, delta-2,4-hexadienoic acid, methacrylic acid, alpha-vinylcinnamic acid and the like, and synthetic resin vehicles generally.

As is the case in the use of other primer pigments, top-coats can be applied over the primer film to increase durability of the system containing the chromite ore reaction product pigment. Uncoated primer film containing the product of this invention is durable, however; thus the film containing it is usually found to be intact and serviceable at a period in exposure when a red lead film is badly chalked and failing by erosion. Conventional black and aluminum topcoats are among the systems satisfactory for application over a film pigmented with the reaction product of this invention.

As stated, the low cost, color, and hiding power characteristics of our chrome ore reaction product pigment make it suitable for use as the sole pigment of a film-forming composition. In such instances, it is desirable to use sufficient material to give a final film containing 30% to 40% by volume of the pigment. If desired, the pigment can be suitably extended or augmented with other materials such as are customarily used with prior art primer pigments. Examples of extenders used in this manner include iron oxide, ferrite yellow, talc, asbestine, calcium sulfate, barium sulfate, various silicates, and the like. Furthermore, the pigment can be augmented by the addition of other prior art colored or white pigments, such as red lead, zinc yellow, calcium chromate, zinc sulfide, titanium oxide, lithopone, etc. If desired, also, organic agents such as the polar type, including materials of anionic and cationic characteristics, as contemplated in the co-pending application Serial No. 484,883, filed April 28, 1943, of C. K. Sloan, can be added to the pigment to modify water-sensitivity or dispersion control properties, such as can stability, consistency, degree of hard caking, case of application, and the like.

The composition of the final alkaline earth/chromite ore dry reaction pigment is to some extent dependent upon both the alkaline earth material used and the particular grade of chromite ore employed. The following table gives an analysis, calculated in terms of oxide content, of representative pigments prepared in accordance with the invention from several particular types of chromite ore, namely, a low grade Cuban ore, a Transvaal ore of high iron content, a Rhodesian ore, and a Philippine ore. The elementary analysis is given for two pigments for each of the chromite ores, representing the composition obtained on the one hand using a 40/60 ratio of lime/ore and on the other hand using the same materials in a 50/50 ratio.

| Type of ore | Ratio CaO/ore | Analysis (%) of pigment | | | | | |
|---|---|---|---|---|---|---|---|
| | | Chromium calculated as $Cr_2O_3$ | $Fe_2O_3$ | $Al_2O_3$ | $SiO_2$ | CaO | MgO |
| Cuban | 40/60 | 19.8 | 9 | 16.2 | 3.6 | 41 | 10.8 |
| | 50/50 | 16.5 | 7.5 | 13.5 | 3 | 51 | 9 |
| Philippine (high grade) | 50/50 | 27.2 | 7.0 | 5.8 | 1.3 | 50.3 | 8.0 |
| Transvaal (sample #1) | 40/60 | 27 | 15.5 | 9.6 | 1.2 | 41 | 6 |
| Do | 50/50 | 22.5 | 13 | 8 | 1 | 51 | 5 |
| Transvaal (sample #2) | 45/55 | 26.3 | 14 | 7.5 | 1.9 | 44.1 | 6.1 |
| Rhodesian | 40/60 | 28 | 8 | 10 | 4.5 | 41 | 8.8 |
| | 50/50 | 23.5 | 6.5 | 8.5 | 3.7 | 51 | 7.5 |

In general, the chromium content of pigments produced from the above commercial grades of ore is from 15% to 30% calculated as $Cr_2O_3$. The other components may be within the limits indicated in the above table.

It is to be emphasized that the preferred pigments of this invention are substantially free of active alkali metal compounds, such as sodium, potassium, and the like, although negligible traces of these compounds, such as might ordinarily be present in commercial chromite ores, are permissible.

Because of the wide diversity of materials entering into preparation of our novel dry reaction product pigments and the likelihood that the effective components represent several rather than a single compound, it is difficult to determine what materials in the chromite ore/alkaline earth reaction product pigment are actually responsible for its unexpected excellent behavior, especially in metal protective pigment systems. It does appear, however, that the plurality of components are an effective combination for affording the superior performance attained.

Certain lines in the X-ray powder pattern which our product exhibits appear to be common to the preferred pigment. A number of these characteristic lines are listed below. It will be evident that the characteristic ore lines and the characteristic calcium oxide and calcium carbonate lines are absent. We consider these characteristic lines responsible for the high protective action which are preferred pigment exhibits.

| $d(Å)$ | Line intensity |
|---|---|
| 3.3 | Weak. |
| 2.94–2.96 | Do. |
| 2.90–2.92 | Do. |
| 2.86–2.88 | Moderate. |
| 2.78–2.80 | Do. |
| 2.68–2.70 | Very strong. |
| 2.29–2.31 | Weak to moderate. |
| 2.11–2.13 | Strong. |
| 2.07–2.09 | Very strong. |
| 2.04–2.06 | Moderate. |
| 1.92–1.94 | Strong. |
| 1.58–1.60 | Moderate. |
| 1.48–1.50 | Strong. |

Microscopic examination of our preferred pigments of the line/chromite ore reaction product indicates that the material largely comprises two types of crystals, one of which appears orange and the other bluish-green. These products are in the refractive index range of 1.73 to 1.83. Both materials are isotropic and appear to be somewhat variable in composition, as indicated both by slight changes in color and in refractive index from particle to particle which may be indicative of the presence of solid solutions. These variations are especially striking in the case of the blue-green material which appears to be the major component of the preferred range of pigments. In certain cases small amounts of calcium carbonate crystals (½% or less) may be present. This trace of material can be distinguished because of the birefringent character (refractive indexes of 1.49 and 1.66). This trace of calcium carbonate appears to originate from the slow reaction of air with the pigment at the lower temperatures after roasting is completed. The green component of the mixture appears to undergo a slow reaction with water as evidenced by gradual disappearance in contact with water. It is likely that this material comprises the one containing hexavalent chromium and which is capable of furnishing chromate ion at a controlled rate on exposure of the pigment. The orange-colored component of the mixture appears to exhibit relatively slight if any reactivity with water.

As noted above, the products of our invention are adapted for general pigment use and are especially useful as the pigmenting substance in metal protective pigment or coating composition formulations comprising an organic film-forming binder. Said product will exhibit superior properties over prior art products, especially zinc yellow and basic lead chromate. Furthermore, our products have the advantage that they are free from added alkali and also free from alkali chromates, the presence of which is undesirable because of their water-sensitivity which may cause blistering of the protective coating.

We claim as our invention:

1. As a new black pigment composition, the calcined reaction product of a finely-divided mixture consisting of chromite ore and an alkaline earth compound heat decomposable to the oxide, in the ratio between 50/50 and 60/40, said product containing less than .2% of water-soluble material being substantially free of active alkali metal compounds, in pigment particle size state of subdivision with the major portion of its particles being below 5 microns and at least 95% of its particles being capable of passing a 325 mesh screen and having a pH value ranging from 8.9 to 12.0, a hexavalent chromium content ranging from 8% to 30%, calculated as $CrO_3$, and an acid-insoluble residue ranging from about 2% to 15%.

2. As a new black pigment composition, the dry, calcined reaction product of a finely divided mixture consisting of chromite ore, oxygen and calcium oxide, said ore and oxide being in the ratio between 50/50 and 60/40, said product containing less than .2% of water-soluble material being substantially free of active alkali metal compounds, in a pigment particle size state of comminution with the major portion of its particles being below 5 microns and at least 95% of its particles being capable of passing a 325 mesh screen and having a pH value of from about 10.8 to about 11.8, a hexavalent chromium content equivalent to from about 10% to 18%, calculated as $CrO_3$, and an acid-insoluble residue ranging from about 5% to 10%.

3. As a new black pigment composition, the dry, calcined reaction product of a finely divided mixture consisting of chromite ore, oxygen and calcium hydroxide, said ore and hydroxide being in the ratio between 50/50 and 60/40, said product containing less than .2% of water-soluble material being substantially free of active alkali metal compounds, in a pigment particle size state of comminution with the major portion of its particles being below 5 microns and at least 95% of its particles being capable of passing a 325 mesh screen and having a pH value of from about 10.8 to about 11.8, a hexavalent chromium content equivalent to from about 10% to 18%, calculated as $CrO_3$, and an acid-insoluble residue ranging from about 5% to 10%.

4. As a new black pigment composition, the dry, calcined reaction product of a finely divided mixture consisting of chromite ore, oxygen and calcium carbonate, said ore and carbonate being in the ratio between 50/50 and 60/40, said product containing less than .2% of water-soluble material being substantially free of active metal compounds, in a pigment particle size state of comminution with the major portion of its particles being below 5 microns and at least 95% of its particles being capable of passing a 325 mesh screen and having a pH value of from about 10.8 to about 11.8, a hexavalent chromium content equivalent to from about 10% to 18%, calculated as $CrO_3$, and an acid-insoluble residue ranging from about 5% to 10%.

5. A process for preparing an improved metal protective pigment composition which comprises subjecting a finely-divided mixture consisting of chromite ore and an alkaline earth material heat decomposable to the oxide, in the ratio between 50/50 and 60/40, to reaction at temperatures ranging from about 1000° C.–1200° C. in the presence of a gaseous oxidizing agent, and then disintegrating the resulting dry reaction product to a pigment fineness state of subdivision whereby the major portion of the pigment has a particle size below 5 microns and at least 95% of its particles are capable of passing a 325 mesh screen.

6. A process for preparing an improved metal protective pigment composition which comprises subjecting a finely-divided mixture consisting of chromite ore and calcium oxide, in the ratio between 50/50 and 60/40, to reaction at temperatures ranging from about 1000° C.–1200° C. in the presence of a gaseous oxidizing agent, and then disintegrating the resulting dry reaction product to a pigment fineness state of sub-division whereby the major portion of the pigment has a particle size below 5 microns and at least 95% of its particles are capable of passing a 325 mesh screen.

7. A process for preparing an improved pigment adapted for use as the essential pigment ingredient in metal protective pigment compositions containing an organic film-forming binder, which comprises subjecting a previously-disintegrated, finely-divided mixture consisting of chromite ore and calcium oxide, in the ratio between 52/48 and 58/42 and all of which material is capable of passing through a 100-mesh screen with about 85% thereof capable of passing through a 325-mesh screen, to calcination from about 30 minutes to about one hour, at temperatures ranging from about 1050° C.–1150° C., in the presence of oxygen, and then disintegrating the resulting dry reaction mass to a state where the same is freed of particles above 20 microns and at least 90% of its particles pass a 325-mesh screen.

8. As a new black pigment composition, the dry, calcined reaction product of a finely-divided mixture consisting of chromite ore, oxygen and calcium oxide, said ore and oxide being in the ratio between 52/48 and 58/42, said product containing less than .2% of water-soluble material being substantially free of active metal compounds, in a pigment particle size state of subdivision with the major portion of its particles being below 5 microns and at least 95% of its particles being capable of passing a 325-mesh screen, and having a pH value between 8.9 and 12, a hexavalent chromium content, calculated as $CrO_3$, between 10% and 18%, and an acid insoluble residue ranging from about 5% to 10%.

9. A metal protective coating composition containing an organic vehicle and as the metal protective ingredient thereof the pigment composition of claim 1.

GORDON DERBY PATTERSON.
CLIFFORD KANNE SLOAN.

REFERENCES CITED

The following references are of record in the file of this patent:

UNITED STATES PATENTS

| Number | Name | Date |
|---|---|---|
| 2,359,697 | Udy | Oct. 3, 1944 |

FOREIGN PATENTS

| Number | Country | Date |
|---|---|---|
| 406,445 | British | Mar. 1, 1934 |

OTHER REFERENCES

Doerner State College of Washington, Mining Experiment Station, Bulletin V, Sept. 1939, page 6.